(12) United States Patent
Taniguchi

(10) Patent No.: US 8,040,096 B2
(45) Date of Patent: Oct. 18, 2011

(54) ROTARY ELECTRIC SYSTEM WITH STAR-CONNECTED MULTIPHASE STATOR WINDINGS

(75) Inventor: Makoto Taniguchi, Oobu (JP)

(73) Assignee: Denso Corporation, Kariya (JP)

( * ) Notice: Subject to any disclaimer, the term of this patent is extended or adjusted under 35 U.S.C. 154(b) by 467 days.

(21) Appl. No.: 12/249,497

(22) Filed: Oct. 10, 2008

(65) Prior Publication Data

US 2009/0096394 A1    Apr. 16, 2009

(30) Foreign Application Priority Data

Oct. 10, 2007   (JP) .................................. 2007-264743

(51) Int. Cl.
*G01R 31/02* (2006.01)

(52) U.S. Cl. ........... 318/490; 361/1; 361/23; 363/56.01; 363/56.02; 363/56.03; 363/56.04; 324/500; 324/537; 702/117; 340/635

(58) Field of Classification Search .................. 702/117; 324/500, 537; 361/23, 1; 340/635; 318/490; 363/56.01, 56.02, 56.03, 56.04
See application file for complete search history.

(56) References Cited

U.S. PATENT DOCUMENTS

| | | | | |
|---|---|---|---|---|
| 5,136,220 A | * | 8/1992 | Philipp | 318/362 |
| 5,210,474 A | * | 5/1993 | Oswald | 318/400.13 |
| 5,471,353 A | * | 11/1995 | Codilian et al. | 360/73.03 |
| 5,491,622 A | | 2/1996 | Carosa | |
| 6,226,602 B1 | * | 5/2001 | Schmitt et al. | 702/117 |
| 6,580,236 B2 | * | 6/2003 | Mitsuda | 318/400.17 |
| 6,870,700 B2 | * | 3/2005 | Beppu | 360/73.03 |
| 7,006,230 B2 | * | 2/2006 | Dorrer et al. | 356/451 |
| 7,176,658 B2 | * | 2/2007 | Quazi et al. | 322/24 |

FOREIGN PATENT DOCUMENTS

| | | |
|---|---|---|
| JP | 01-283090 | 11/1989 |
| JP | 06-189579 | 7/1994 |
| JP | 06-351283 | 12/1994 |
| JP | 10-047255 | 2/1998 |
| JP | 2001-231270 | 8/2001 |
| JP | 2001-268966 | 9/2001 |

(Continued)

OTHER PUBLICATIONS

Extended European Search Report dated Jun. 29, 2010, issued in corresponding European Application No. 08017733.0-2207.

(Continued)

*Primary Examiner* — Rita Leykin
(74) *Attorney, Agent, or Firm* — Nixon & Vanderhye P.C.

(57) ABSTRACT

In a rotary electric system, a switch member includes at least one of a first switch and a second switch. The first switch is connected between a neutral point of multiphase stator windings and a high-side electrode of a direct current power source. The second switch is connected between the neutral point and a low-side electrode of the direct current power source. A controller works to turn the switch member off and on thereby switching control of the multiphase inverter between full-wave driving mode and half-wave driving mode. The full-wave driving mode allows the controller to drive all of the high-side and low-side switching elements per phase of the multiphase stator windings. The half-wave driving mode allows the controller to drive any one of the high-side switching element and the low-side switching element per phase of the multiphase stator windings.

38 Claims, 9 Drawing Sheets

FOREIGN PATENT DOCUMENTS

| | | |
|---|---|---|
| JP | 2005-143189 | 6/2005 |
| JP | 2007-056787 | 3/2007 |
| JP | 2007-074831 | 3/2007 |
| JP | 2007-099066 | 4/2007 |

OTHER PUBLICATIONS

Japanese Office Action dated Sep. 8, 2009, issued in corresponding Japanese Application No. 2007-264743, with English translation.

* cited by examiner

ROTARY ELECTRIC SYSTEM WITH STAR-CONNECTED MULTIPHASE STATOR WINDINGS

CROSS REFERENCE TO RELATED APPLICATIONS

This application is based on Japanese Patent Application 2007-264743 filed on Oct. 10, 2007. The descriptions of the Patent Application are all incorporated herein by reference.

FIELD OF THE INVENTION

The present invention relates to a rotary electric system equipped with a multiphase inverter including a pair of high-side and low-side switching elements for each phase of a multiphase motor, and more particularly to such a rotary electric system designed to address a fault, such as an open fault, of at least one switching element constituting the inverter.

BACKGROUND OF THE INVENTION

Alternating current (AC) motor systems are used widely for: motor vehicles as their electric power steering systems, hybrid vehicles as their drive systems, and electric compressors as their drive systems. Such an AC motor system is designed to drive a multiphase motor having a multiphase stator coil by a multiphase inverter; this multiphase stator coil consists of star-connected multiphase stator windings.

As high-side switching elements and low-side switching elements (upper-arm switching elements and lower-arm switching elements) of the multiphase inverter, power semiconductor switching elements, such as IGBTs and/or MOSFETs, are normally used. In order to improve reliability, it is desirable for such AC motor systems to be designed to address open faults of the power semiconductor switching elements.

Japanese Patent Application Publication No. 2007-099066 discloses an electric power steering system for addressing open faults of power semiconductor switching elements constituting a three-phase inverter for driving a star-connected three-phase brushless motor.

The electric power steering system is provided with a first relay connected in series between a U-phase stator winding and a neutral point of the star-connected three-phase stator windings and a second relay connected in series between a V-phase stator winding and the neutral point of the star-connected three-phase stator windings.

The electric power steering system is also provided with a third relay connected in series between a W-phase stator winding and the neutral point of the star-connected three-phase stator windings, and a fourth relay connected between the neutral point of the star-connected three-phase stator windings and a neutral-point driver.

When a power semiconductor switching element for one phase stator winding fails, the relay corresponding to the one phase stator winding is turned off and the fourth relay is turned on. This allows the three-phase inverter to drive the remaining two-phase stator windings of the three-phase brushless motor. This driving method for driving the remaining two-phase stator windings will be referred to as "two-phase stator winding driving method" hereinafter.

However, the two-phase stator winding driving method may increase variations in the rotation of the three-phase brushless motor and those in the torque created thereby, as compared with driving of the three-phase stator windings of the three-phase brushless motor. This results in reducing the drivability of the three-phase brushless motor.

In addition, the electric power steering system disclosed in the Patent Application Publication may have a complicated circuit structure that individually turns off a power semiconductor switching element for each phase stator winding and turns on the fourth relay. This may increase the electric power steering system in size and/or manufacturing cost, resulting in reducing the installability of the electric power steering system in various vehicles and machines.

SUMMARY OF THE INVENTION

In view of the circumstances set force above, an object of an aspect of the present invention is to provide rotary electric systems each provided with a multiphase inverter including a pair of high-side and low-side switching elements for each phase of a multiphase motor; these systems are each capable of reliably addressing faults of the high-side switching element or low-side switching element with its circuit structure being uncomplicated.

According to one aspect of the present invention, there is provided a rotary electric system. The rotary electric system includes a rotary electric machine provided with a rotor and star-connected multiphase stator windings with a neutral point. The rotary electric machine works to rotate the rotor when the multiphase stator windings are energized. The rotary electric system includes a direct current power source having a high-side electrode and a low-side electrode, and a multiphase inverter. The multiphase inverter includes a high-side switching element and a low-side switching element per phase of the multiphase stator windings. The high-side and low-side switching elements are connected with each other in series. The multiphase inverter works to energize the multiphase stator windings based on power supplied from the direct current power source when driven. The rotary electric system includes a switch member including at least one of a first switch and a second switch. The first switch is connected between the neutral point of the multiphase stator windings and the high-side electrode. The second switch is connected between the neutral point of the multiphase stator windings and the low-side electrode. The rotary electric system includes a controller connected with the high-side and low-side switching elements per phase of the multiphase stator windings and with the switch member and working to turn the switch member off and on to thereby switch control of the multiphase inverter between full-wave driving mode and half-wave driving mode. The full-wave driving mode allows the controller to drive all of the high-side and low-side switching elements per phase of the multiphase stator windings. The half-wave driving mode allows the controller to drive any one of the high-side switching element and the low-side switching element per phase of the multiphase stator windings.

According to the one aspect of the present invention, the rotary electric system allows selectively control of the multiphase inverter in the full-wave driving mode or in the half-wave driving mode.

Specifically, when the switch member includes the first switch and an open fault occurs in at least one high-side switching element, the controller works to turn the switch member on to thereby switch control of the multiphase inverter from the full-wave driving mode to the half-wave driving mode via the low-side switching element per phase without using the high-side switching element per phase.

It is therefore possible to drive the multiphase stator windings to thereby continuously rotate the rotor even though at least one high-side switching element of the multiphase inverter fails without using switches for the respective multiphase stator windings.

This achieves an effect of reliably addressing an open fault occurring in at least one high-side switching element of the multiphase inverter with the circuit structure of the rotary electric system being uncomplicated.

In addition, in the half-wave driving mode, the controller drives any one of the high-side switching element and the low-side switching element per phase of the multiphase stator windings. As compared with the two-phase stator winding driving method, it is possible to reduce current unbalance among the multiphase stator windings, thus reducing torque ripples appearing in the multiphase rotary electric machine.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings.

Figure 1:
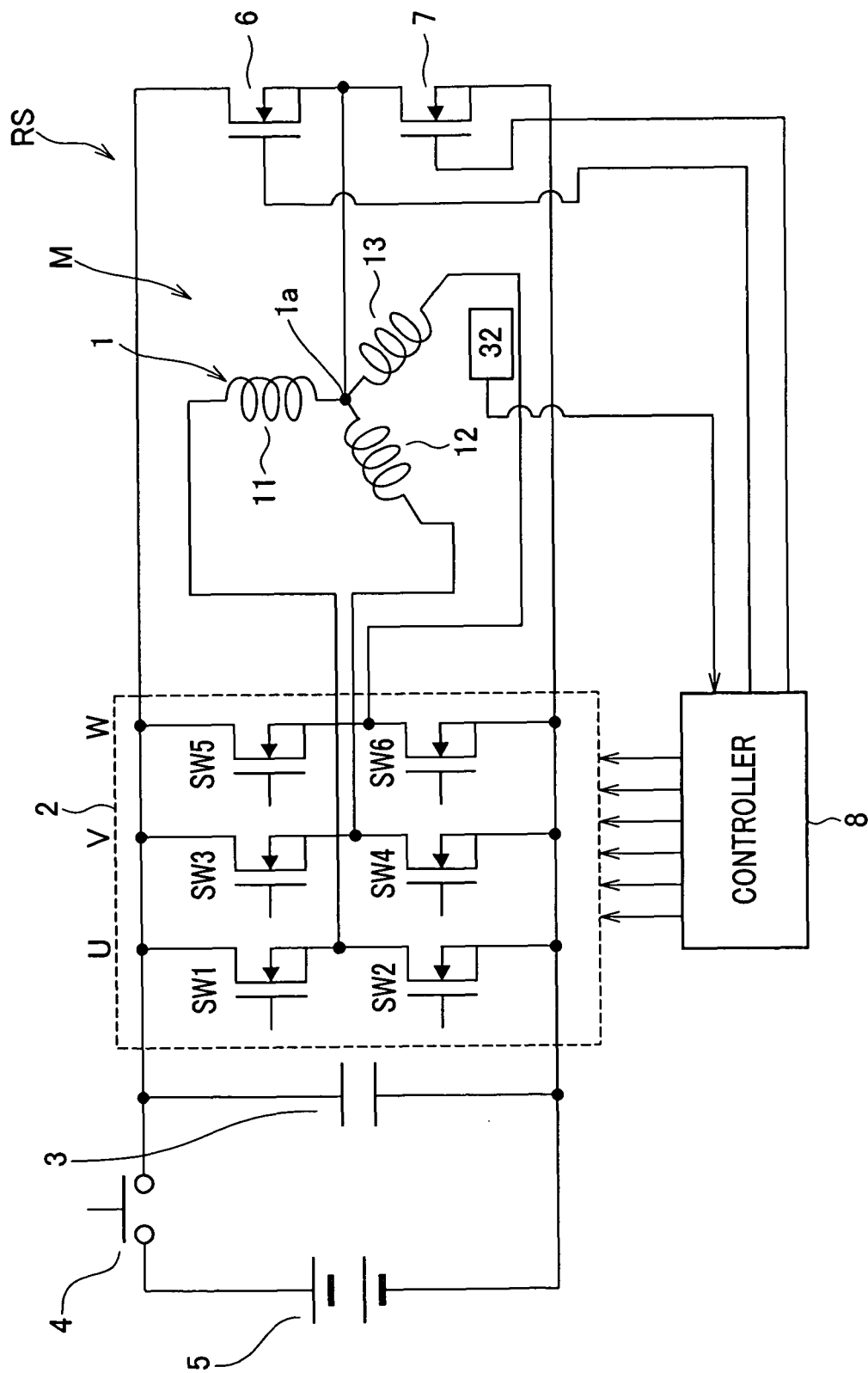
FIG. 1 is a circuit diagram schematically illustrating an example of the structure of a rotary electric system according to an embodiment of the present invention.

Referring to FIG. 1, there is provided a rotary electric system RS according to an embodiment of the present invention.

The rotary electric system RS includes a three-phase motor M equipped with an annular rotor (not shown) and a star-connected three-phase stator coil 1. The annular rotor is provided at its circumferential portion with at least one north pole (N) and at least one south pole (S).

The rotary electric system RS also includes a three-phase inverter 2 for supplying three-phase AC power to the three-phase stator coil 1, and a smoothing capacitor 3 operative to smooth an input DC voltage to be inputted to the inverter 2.

The stator coil 1 consists of a stator core (not shown) disposed around the outer periphery of the rotor such that the inner periphery of the stator core is opposite to the outer periphery of the rotor with a predetermined air gap.

The stator coil 1 also consists of a U-phase stator winding 11, a V-phase stator winding 12, and a W-phase stator winding 13. The stator core for example has a plurality of slots. The slots are for example formed through the stator core and are circumferentially arranged at given intervals.

The three-phase stator windings 11, 12, and 13 are wound in the slots such that the U-, V-, and W-phase stator windings 11, 12, and 13 are shifted by an electric angle of, for example, $2\pi/3$ radian in phase from each other. One ends of the U-, V-, and W-phase stator windings 11, 12, and 13 are connected to each other in star configuration to constitute a neutral point 1a.

The rotary electric machine RS also includes a battery 5 for supplying the DC voltage to the inverter 2 via the smoothing capacitor 3, and a relay 4 for opening or closing an electrical connection between the inverter 2 and the battery 5. The rotary electric machine RS further includes a first switch 6 and a second switch 7. The first switch 6 works to open or close an electrical connection between the neutral point 1a of the stator coil 1 and a high-side terminal of the inverter 2. The second switch 7 works to open or close the neutral point 1a of the stator coil 1 and a low-side terminal of the inverter 2.

Additionally, the rotary electric machine RS includes a controller 8 for controlling the inverter 2, the first switch 6, the second switch 7, and the relay 4.

The inverter 2 is composed of a first pair (bridge arm) of series-connected switching elements SW1 and SW2, a second pair of series-connected switching elements SW3 and SW4, and a third pair of series-connected switching elements SW5 and SW6. The inverter 2 is also composed of flywheel diodes (not shown) connected in antiparallel with the switching elements SW1, SW2, SW3, SW4, SW5, and SW6, respectively.

As the switching elements SW1, SW2, SW3, SW4, SW5, and SW6, IGBTs (Insulated Gate Bipolar Transistors) or power MOSFETs can be used. When the power MOSFETs are used as the switching elements, the intrinsic diodes of the power MOSFETs can be used in place of the flywheel diodes.

In the embodiment, as each of the switching elements SW1 to SW6, a MOSFET device with current-sense terminals is used.

Figure 2:
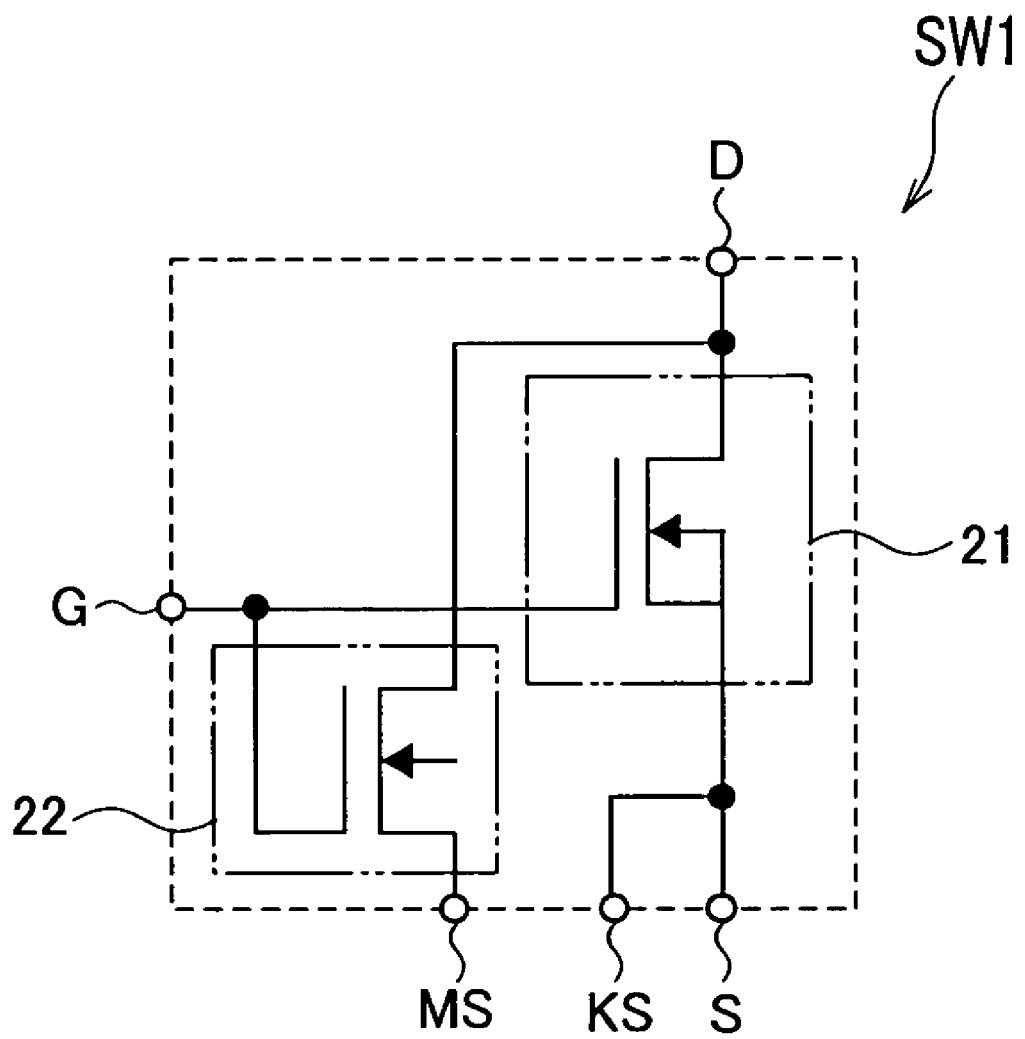
FIG. 2 is an enlarged circuit diagram schematically illustrating an example of the structure of a switching element of an inverter illustrated in FIG. 1.

FIG. 2 schematically illustrates the switching element SW1 to which the MOSFET device with a current-sense terminal is used. Each of the remaining switching elements SW2 to SW6 are identical in configuration to the switching element SW1.

Referring to FIG. 2, the switching element SW1 includes a pair of NMOSFETs 21 and 22. For example, a NMOSFET chip corresponding to the NMOSFET 22 is prepared, and a current-sensing MOSFET 21 is integrated on the NMOSFET chip to thereby easily produce the switching element SW1 with the current-sense terminal.

The drains D and gates G of the NMOSFETs 21 and 22 are in common with each other. The common drain D and common gate G serve as the drain and gate of the switching element SW1. The common gate G of the switching element SW1 serves as a control terminal thereof.

Reference character MS represents the source of the NMOSFET 22, and reference character S represents the source of the NMOSFET 21. Reference character KS represents a sense-terminal of the switching elements SW1; this sense-terminal is connected to the controller 8.

Specifically, when a voltage with a level higher than a preset threshold voltage of the switching element SW1 is applied to the gate G thereof, a main current flows through the NMOSFET 22 and a branch current with a value proportional to that of the main current flows through the NMOSFET 21. Thus, the controller 8 monitors the value of the branch current flowing out of the sense-terminal KS to thereby measure the value of the main current flowing through the switching element SW1.

Note that each of the switching elements SW1 to SW6 can be designed as a normal MOSFET or IGBT, and an external current-sense circuit can be provided for each of the switching elements SW1 to SW6; this external current-sense circuit works to measure a value of a current flowing through each of the switching elements SW1 to SW6.

The cathode of each of the flywheel diodes is connected with the drain of a corresponding one of the switching elements, and the anode thereof is connected with the source of a corresponding one of the switching elements.

The first to third bridge arms of switching elements SW1 to SW6 are parallely connected with each other in bridge configuration.

A connecting point through which the switching elements SW1 and SW2 of the first pair are connected with each other in series is connected with an output lead extending from the output end (other end) of the U-phase stator winding 11. Similarly, a connecting point through which the switching elements SW3 and SW4 of the second pair are connected with each other in series is connected with an output lead extending from the output end (other end) of the V-phase stator winding 12. Moreover, a connecting point through which the switching elements SW5 and SW6 of the third pair are connected with each other in series is connected with an output lead extending from the output end (other end) of the W-phase stator winding 13.

One end of each of the first, second, and third bridge arms corresponding to the high-side DC input terminal of the inverter 2 is connected with a high-side electrode of the battery 5 and with one electrode of the capacitor 3. The other end of each of the first, second, and third bridge arms corresponding to the low-side DC input terminal of the inverter 2 is connected with a low-side electrode of the battery 4 and with the other electrode of the capacitor 3.

The controller 8 is connected with the control terminal of each of the switching elements SW1 to SW6, with a pole position sensor 32 for measuring a rotational pole position (angular pole position) of the rotor, and with a power source (not shown). The pole position sensor 32 is normally designed to use a resolver or a circuit composed of a magnet and a hall IC. The controller 8 can be designed to sensorlessly measure an angular pole position of the rotor with the use of, for example, the zero crossing of an induced voltage in one of the three-phase stator windings 11, 12, and 13 based on the zero crossing of the amount of change in a phase current to flow through the one of the three-phase stator windings. The zero crossing of an induced voltage in one of the three-phase stator windings represents an angular pole position of the rotor.

The controller 8 is integrated with a microcomputer and its peripheries including a driver for driving each switching element and relay. The controller 8 works to operate in full-wave driving mode including well-known 120-degree modulation, 180-degree modulation, or PWM sine-wave modulation to thereby individually drive on and off the switching elements SW1, SW2, SW3, SW4, SW5, and SW6 based on the measured angular pole position of the rotor.

The full-wave driving mode is to individually drive on and off the switching elements SW1, SW2, SW3, SW4, SW5, and SW6 (both of the upper-arm switching elements SW1, SW3, SW5 and the lower-arm switching elements SW2, SW4, and SW6).

For example, in the 120-degree modulation, each of the three-phase stator windings 11, 12, and 13 is energized in positive phase during rotation of the rotor by 120 electric degrees, and after rotation of the rotor by 60 electric degrees, each of the three-phase stator windings 11, 12, and 13 is energized in negative phase for rotation of the rotor by 120 electric degrees.

In the 180-degree modulation, each of the three-phase stator windings 11, 12, and 13 is energized in positive phase during rotation of the rotor by 180 electric degrees, and continuously energized in negative phase during rotation of the rotor by 180 electric degrees.

In the PWM sine-wave modulation, drive currents with pulse widths that are sinusoidally modulated are supplied to the three-phase stator windings 11, 12, and 13. This smoothly drive the three-phase motor M with little torque ripples.

The circuit structure of the rotary electric machine RS is specifically equipped with the first switch 6 that can short-circuit the neutral point 1a to the high-side terminal of the inverter 2; this first switch 6 therefore serves as high-side switching element short-circuiting switch. The circuit structure of the rotary electric machine RS is also specifically equipped with the second switch 7 that can short-circuit the neutral point 1a to the low-side terminal of the inverter; this second switch 7 serves as low-side switching element short-circuiting switch.

Figure 3:
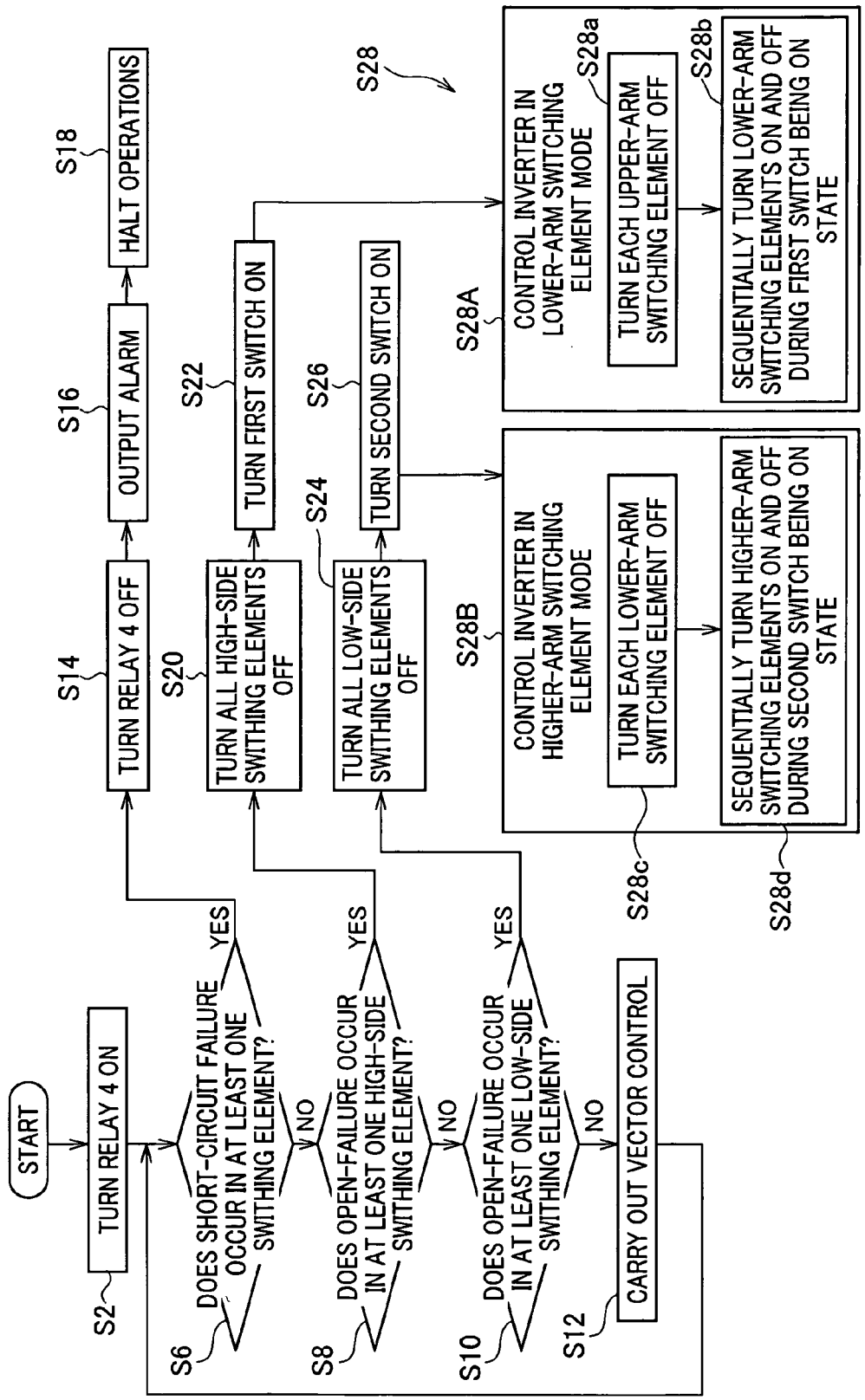
FIG. 3 is a flowchart schematically illustrating operations to be executed by a controller illustrated in FIG. 1.

Operations of the rotary electric machine RS will be described hereinafter with reference to FIG. 3. The operations are designed to be executed by the controller 8.

When energized by the power source, the controller 8 turns the relay 4 on, resulting in that a DC voltage is applied from the battery 5 to the inverter 2 via the relay 4 in step S2.

Next, the controller 8 determines whether short-circuit failure occurs in at least one of the switching elements SW1 to SW6 in step S6.

For example, in step S6, the controller 8 individually supplies, in time sequential manner, a gate signal to the gate of each of the switching elements SW1 to SW6 to thereby turn it off.

During one of the switching elements SW1 to SW6 being off state, the controller 8 receives a value of a branch current flowing out of the sense-terminal KS of the corresponding one of the switching elements SW1 to SW6. Next, in step S6, the controller 8 measures a value of a main current flowing through the corresponding one of the switching elements SW1 to SW6 based on the received value of the branch current.

Thereafter, in step S6, the controller 8 compares the measured value of the main current flowing through the corresponding one of the switching elements SW1 to SW6 with a preset threshold value. Based on a result of the comparison, the controller 8 determines whether the measured value of the main current flowing through the corresponding one of the switching elements SW1 to SW6 exceeds the preset threshold value.

Upon determining that the measured value of the main current flowing through the corresponding one of the switching elements SW1 to SW6 exceeds the preset threshold value, the controller 8 determines that short-circuit failure occurs in the corresponding one of the switching elements SW1 to SW6 in step S6.

Upon determining that short-circuit failure occurs in at least one of the switching elements SW1 to SW6 (the determination in step S6 is YES), the controller 8 turns the relay 4 off in step S14, visibly or audibly informs an operator for the rotary electric machine RS of information indicative of at least one switching element being short-circuited in step S16. Thereafter, the controller 8 halts operations of the rotary electric system RS in step S18.

Upon determining that short-circuit failure does not occur in any one of the switching elements SW1 to SW6 (the determination in step S6 is NO), the controller 8 proceeds to step S8.

In step S8, the controller 8 determines whether open-circuit failure (disconnection fault) occurs in each of the upper-arm switching elements SW1, SW3, and SW5.

For example, in step S8, the controller 8 individually supplies, in time sequential manner, a gate signal to the gate of each of the upper-arm switching elements SW1, SW3, and SW5 to thereby turn it on.

During one of the upper-arm switching elements SW1, SW3, and SW5 being on state, the controller 8 receives a value of a branch current flowing out of the sense-terminal KS of the corresponding one of the upper-arm switching elements SW1, SW3, and SW5. Next, in step S8, the controller 8 measures a value of a main current flowing through the corresponding one of the upper-arm switching elements SW1, SW3, and SW5 based on the received value of the branch current.

Thereafter, in step S8, the controller 8 compares the measured value of the main current flowing through the corresponding one of the upper-arm switching elements SW1, SW3, and SW5 with a preset threshold value. Based on a result of the comparison, the controller 8 determines whether the measured value of the main current flowing through the corresponding one of the upper-arm switching elements SW1, SW3, and SW5 exceeds the preset threshold value.

Upon determining that the measured value of the main current flowing through at least one of the upper-arm switching elements SW1, SW3, and SW5 is less than the preset threshold value, the controller 8 determines that open-circuit fault occurs in the at least one of the upper-arm switching elements SW1, SW3, and SW5 in step S8.

Upon determining that open-circuit failure occurs in at least one of the upper-arm switching elements SW1, SW3, and SW5, (the determination in step S8 is YES), the controller 8 turns each of the upper-arm switching elements SW1, SW3, and SW5 off in step S20, and turns the first switch 6 on in step S22, proceeding to step S28A.

In step S28A, the controller 8 carries out control of the inverter 2 in lower-arm half-wave driving mode. Specifically, in the lower-arm switching-element driving mode, the controller 8 turns each of the upper-arm switching elements SW1, SW3, SW5 off in step S28a. In step S28b, the controller 8 turns the first switch 6 on, and sequentially turns each of the individual the lower-arm switching elements SW2, SW4, and SW6 on and off during the first switch 6 being on state. This allows the three-phase motor M to operate in three-phase half-wave driving mode.

Figure 4:
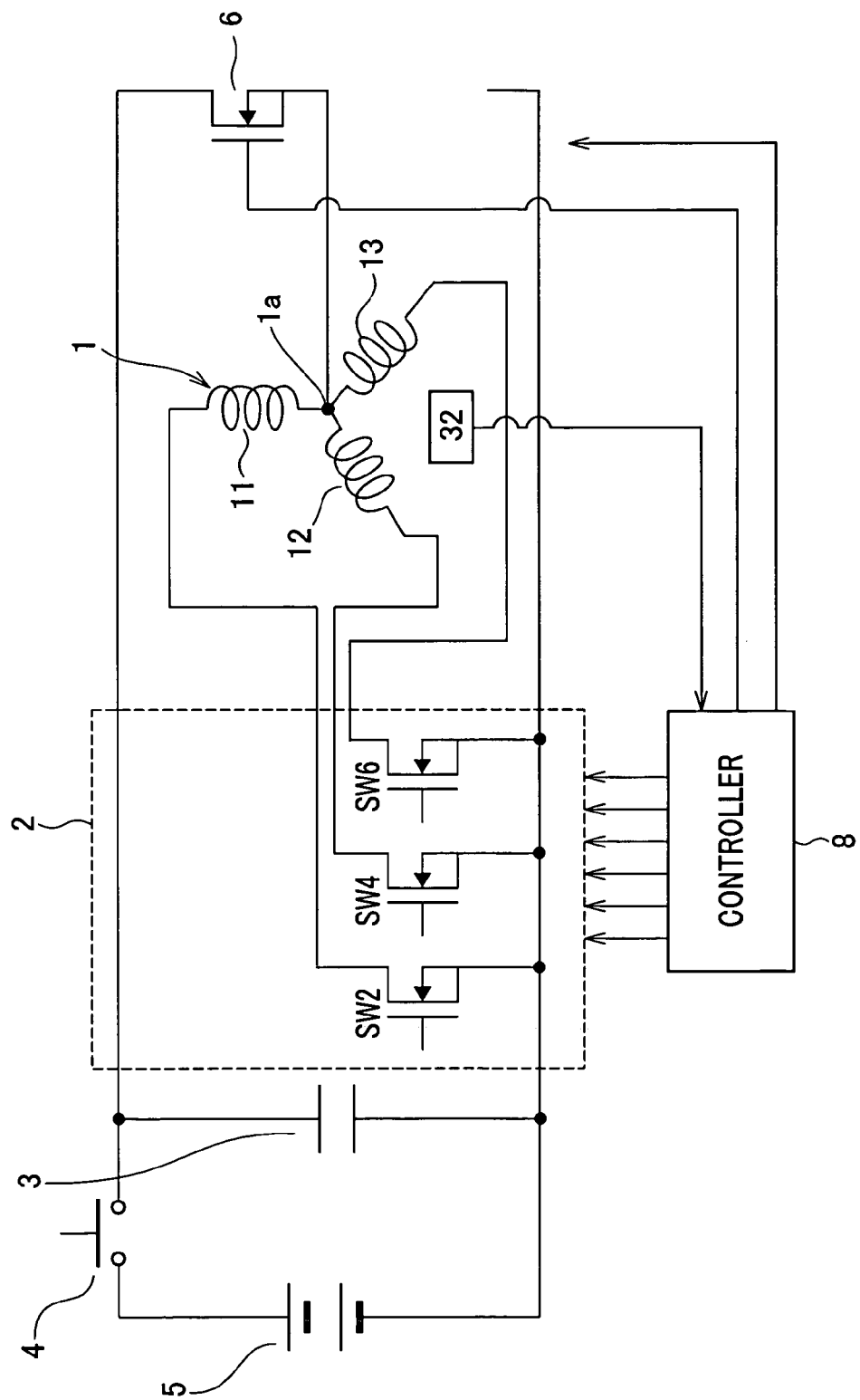
FIG. 4 is a circuit diagram schematically illustrating the rotary electric system when the controller controls the inverter in lower-arm half-wave driving mode according to the embodiment.

Operations of the rotary electric system RS in the lower-arm half-wave driving mode will be described hereinafter with reference to FIG. 4.

In the lower-arm half-wave driving mode, when the first switch 6 is turned on with the second switch 7 being off state, electrical connection between the high-side electrode of the battery 5 and the neutral point 1a is established via the first switch 6. Thereafter, the controller 8 individually drives on and off the lower-arm switching elements SW2, SW4, and SW6 based on the measured angular pole position of the rotor. This allows a substantially square-wave voltage to be applied to each of the three-phase stator windings 11, 12, and 13 of the stator coil 1. For example, when the lower-arm switching element SW2 is turned on, a drive current based on the square-waved voltage supplied from the battery 5 is supplied to flow via the first switch 6, the neutral point N, the U-phase stator winding 11, and the lower-arm switching element SW2.

Thus, sequential drive of the respective three-phase stator windings 11, 12, and 13 allows the three-phase motor M to rotate.

For example, in the embodiment, the controller 8 is programmed to adjust an on period (on duration) of each of the lower-arm switching elements SW2, SW4, and SW6 to be within a range between 120 electric degrees and 180 electric degrees. This adjustment method has been well-known in the art to which the present invention belongs, and therefore, detailed descriptions for the adjustment method are omitted.

Otherwise, upon determining that open-circuit failure does not occur in any one of the upper-arm switching elements SW1, SW3, and SW5, (the determination in step S8 is NO), the controller 8 proceeds to step S10.

In step S10, the controller 8 determines whether open-circuit failure (disconnection fault) occurs in each of the lower-arm switching elements SW2, SW4, and SW6.

For example, in step S10, the controller 8 individually supplies, in time sequential manner, a gate signal to the gate of each of the lower-arm switching elements SW2, SW4, and SW6 to thereby turn it on.

During one of the lower-arm switching elements SW2, SW4, and SW6 being on state, the controller 8 receives a value of a branch current flowing out of the sense-terminal KS of the corresponding one of the lower-arm switching elements SW2, SW4, and SW6. Next, in step S10, the controller 8 measures a value of a main current flowing through the corresponding one of the lower-arm switching elements SW2, SW4, and SW6 based on the received value of the branch current.

Thereafter, in step S10, the controller 8 compares the measured value of the main current flowing through the corresponding one of the lower-arm switching elements SW2, SW4, and SW6 with a preset threshold value. Based on a result of the comparison, the controller 8 determines whether the measured value of the main current flowing through the corresponding one of the lower-arm switching elements SW2, SW4, and SW6 exceeds the preset threshold value.

Upon determining that the measured value of the main current flowing through at least one of the lower-arm switching elements SW2, SW4, and SW6 is less than the preset threshold value, the controller 8 determines that open-circuit fault occurs in the at least one of the lower-arm switching elements SW2, SW4, and SW6 in step S10.

Upon determining that open-circuit failure occurs in at least one of the lower-arm switching elements SW2, SW4, and SW6, (the determination in step S10 is YES), the controller 8 turns each of the lower-arm switching elements SW2, SW4, and SW6 off in step S24, and turns the second switch 7 on in step S26, proceeding to step S28B.

In step S28B, the controller 8 carries out control of the inverter 2 in upper-arm half-wave driving mode. Specifically, in the upper-arm switching-element driving mode, the controller 8 turns each of the lower-arm switching elements SW2, SW4, SW6 off in step S28c. In step S28d, the controller 8 turns the second switch 7 on, and sequentially turns each of the individual the upper-arm switching elements SW1, SW3, and SW5 on and off during the second switch 7 being on state. This allows the three-phase motor M to operate in three-phase half-wave driving mode.

Figure 5:
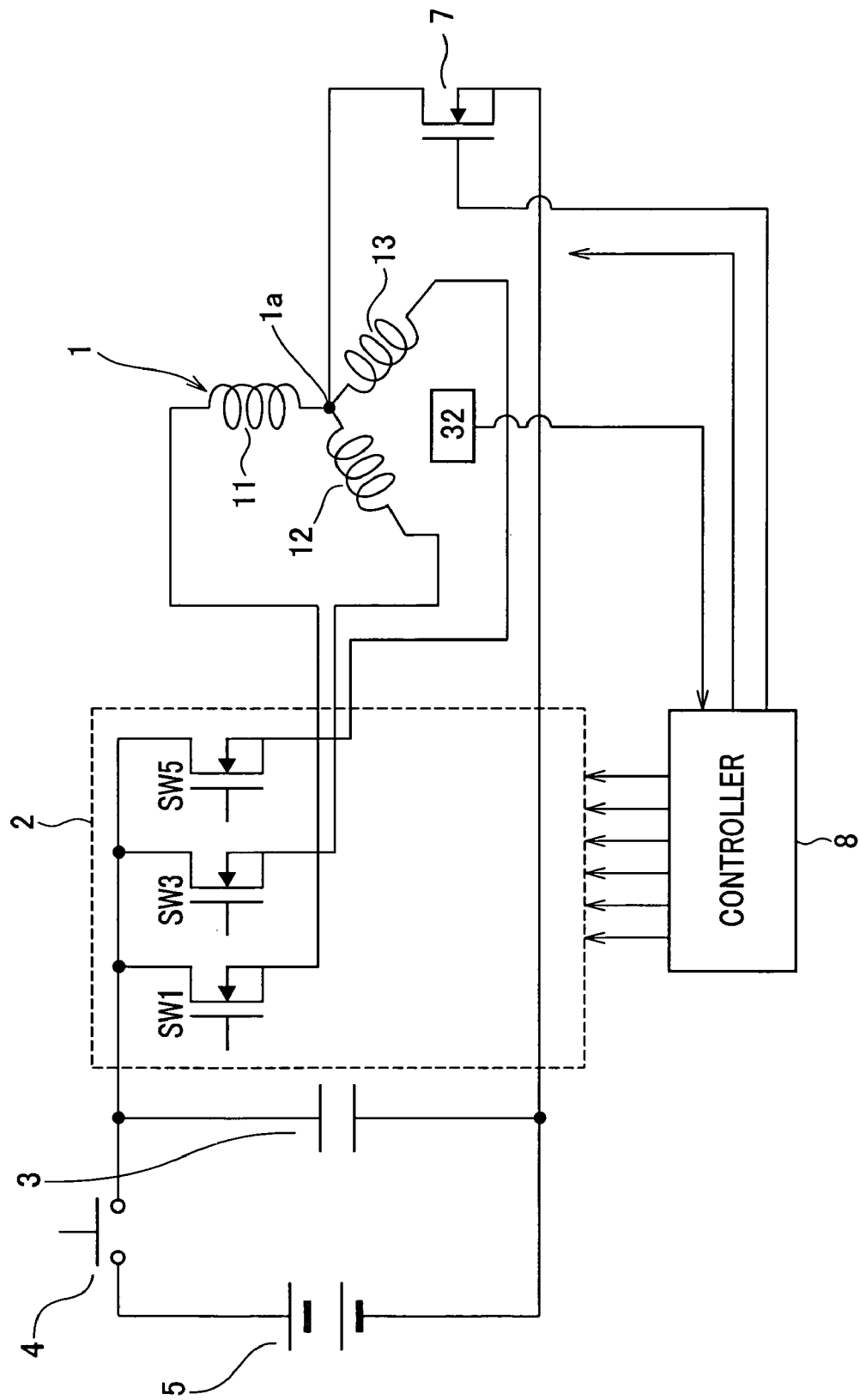
FIG. 5 is a circuit diagram schematically illustrating the rotary electric system when the controller controls the inverter in upper-arm half-wave driving mode according to the embodiment.

Operations of the rotary electric system RS in the upper-arm half-wave driving mode will be described hereinafter with reference to FIG. 5.

In the upper-arm half-wave driving mode, when the second switch 7 is turned on with the first switch 6 being off state, electrical connection between the low-side electrode of the battery 5 and the neutral point 1a is established via the second switch 7. Thereafter, the controller 8 individually drives on and off the upper-arm switching elements SW1, SW3, and SW5 based on the measured angular pole position of the rotor. This allows a square-waved voltage to be applied to each of the three-phase stator windings 11, 12, and 13 of the stator coil 1. For example, when the upper-arm switching element SW3 is turned on, a drive current based on the square-waved voltage supplied from the battery 5 is supplied to flow via the upper-arm switching element SW3, the V-phase stator winding 12, the neutral point 1a, and the second switch 7.

Thus, sequential drive of the respective three-phase stator windings 11, 12, and 13 allows the three-phase motor M to rotate.

For example, in the embodiment, the controller 8 is programmed to adjust an on period (on duration) of each of the upper-arm switching elements SW1, SW3, and SW5 to be within a range between 120 electric degrees and 180 electric degrees. This adjustment method has been well-known in the art to which the present invention belongs, and therefore, detailed descriptions for the adjustment method are omitted.

Otherwise, upon determining that each of the switching elements SW1 to SW6 normally operates (the determination in step S10 is NO), the controller 8 carries out control of the inverter 2 in the full-wave driving mode with the use of vector control.

The vector control is for example to:

establish a d-axis corresponding to a direction of flux created by the rotor and a q-axis orthogonal to the d-axis;

resolve a stator current to be applied to each of the three-phase stator windings 11, 12, and 13 from the inverter 2 into separately controllable flux producing current component and torque producing current component (q-axis current component) in the d-q axis system; and control a current vector based on the i-axis current component and q-axis current component to thereby control operating parameters of the three-phase motor M, such as torque created by the three-phase motor M, and a rotation speed thereof.

As described above, the rotary electric system RS according to the embodiment is provided with:

the first switch 6 for connecting the neutral point 1a with the high-side electrode of the battery 5 connected with the high-side terminal of the inverter 2; and the second switch 7 for connecting the neutral point 1a with the low-side electrode of the battery 5 connected with the low-side terminal of the inverter 2.

In addition, the rotary electric system RS is designed to turn each of the first and second switches 6 and 7 individually on or off to thereby switch control of the inverter 2 between the full-wave driving mode and the half-wave driving mode.

Specifically, when detecting an open fault occurring in at least one of the high-side switching elements SW1, SW3, and SW5, the rotary electric system RS is designed to turn:

the high-side switching elements SW1, SW3, and SW5 off; and the first switch 6 on with the second switch being in off state to thereby switch control of the inverter 2 from the full-wave driving mode to the lower-arm half-wave driving mode.

Thus, it is possible to drive the three-phase stator windings 11, 12, and 13 in the lower-arm half-wave driving mode to thereby continuously rotate the three-phase motor M without using switches for respective three-phase stator windings 11, 12, and 13 of the stator coil 1.

In addition, when detecting an open fault occurring in at least one of the low-side switching elements SW2, SW4, and SW6, the rotary electric system RS is designed to turn:

the low-side switching elements SW2, SW4, and SW6 off; and the second switch 7 on with the first switch being in off state to thereby switch control of the inverter 2 from the full-wave driving mode to the upper-arm half-wave driving mode.

Thus, it is possible to drive the three-phase stator windings 11, 12, and 13 in the upper-arm half-wave driving mode to thereby continuously rotate the three-phase motor M without using switches for respective three-phase stator windings 11, 12, and 13 of the stator coil 1.

As described above, the rotary electric system RS according to the embodiment drives the three-phase stator windings 11, 12, and 13 to thereby continuously rotate the three-phase motor M even though at least one switching element of the inverter 2 fails without using switches for respective three-phase stator windings 11, 12, and 13 of the stator coil 1.

For this reason, the rotary electric system RS achieves an effect of reliably addressing a fault occurring in at least one switching element of the inverter 2 with the circuit structure of the rotary electric system RS being complicated.

In addition, in the upper-arm half-wave driving mode or lower-arm half-wave driving mode, the controller 8 sequentially drives the upper-arm three-phase switching elements or the lower-arm three-phase switching elements.

As compared with the two-phase stator winding driving method, it is therefore possible to reduce current unbalance among the three-phase stator windings 11, 12, and 13, thus reducing torque ripples appearing in the three-phase motor M.

In the half-wave driving mode, the controller 8 is designed to apply a substantially square-wave voltage to each of the three-phase stator windings 11, 12, and 13 during an on period (on duration) of a corresponding one of the higher or lower-arm switching elements; this on period is determined within a range from 120 electric degrees to 180 electric degrees of rotation of the rotor.

This can cause a current merely required for the three-phase motor M to flow therethrough, making it possible to reduce a burden on the battery 5.

Next, a first modification of the embodiment will be described hereinafter.

In the half-wave driving mode, the peak-to-peak amplitude of a pulse voltage to be applied to each of the high-side or low-side switching elements is reduced as compared with that of a pulse voltage to be applied to each of the switching elements in the full-wave driving mode.

In order to adjust a current to be supplied to each phase stator winding of the stator coil 1 to a required value, a rotary electric system RS1 according to the embodiment can use constant-current feedback control in the half-wave driving mode. Like parts between the rotary electric systems RS and RS1 according to the embodiment and the first modification, to which like reference characters are assigned, are omitted or simplified in description.

Figure 6:
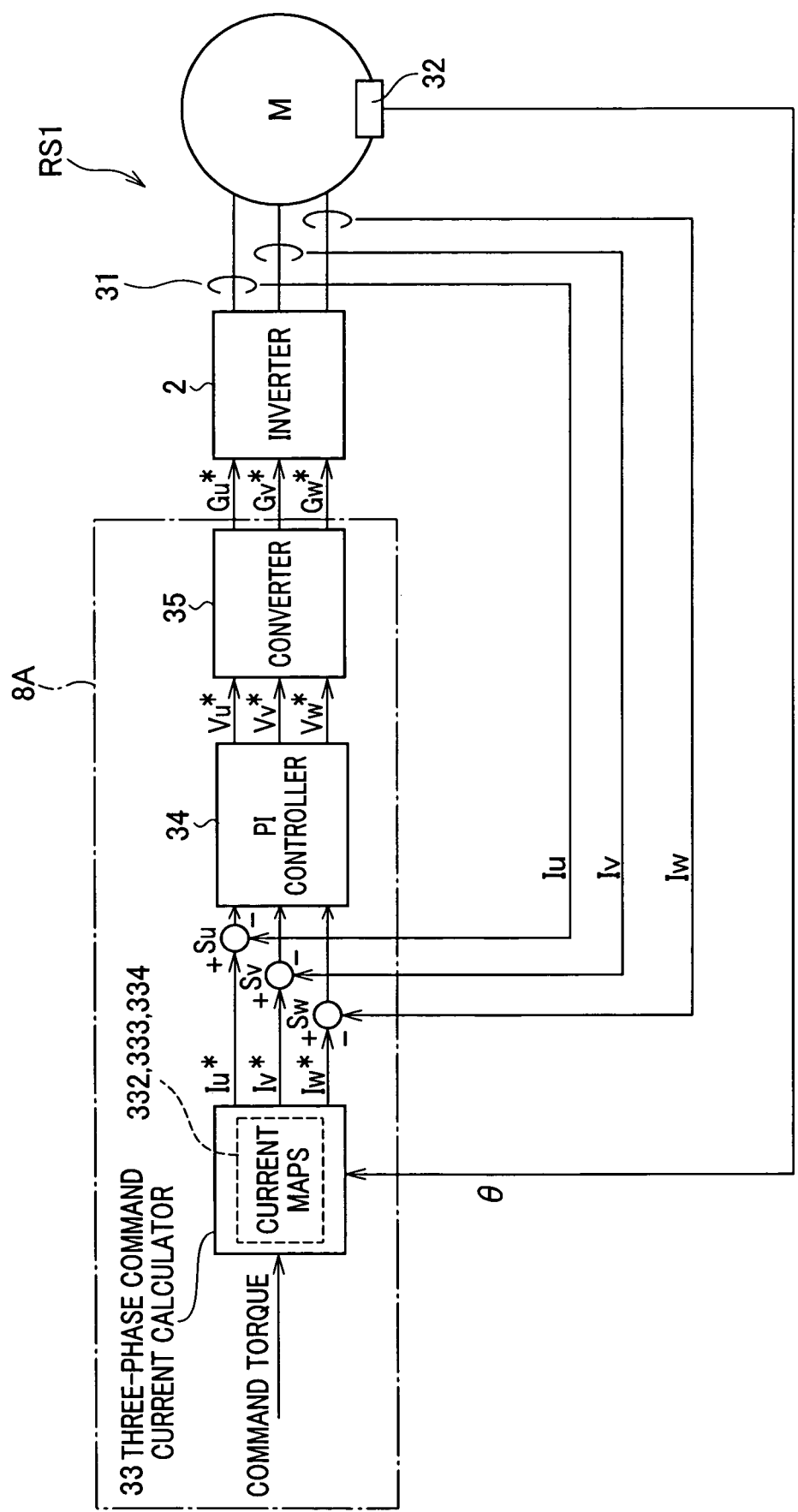
FIG. 6 is a circuit diagram schematically illustrating an example of the structure of a rotary electric system according to a first modification of the embodiment of the present invention.

Referring to FIG. 6, the rotary electric system RS1 according to the first modification is equipped with current sensors 31 for measuring phase currents to be supplied to the respective phase stator windings 11, 12, and 13. Each of the current sensors 31 is designed to use, for example, a hall IC.

The rotary electric system RS1 is also equipped with a controller 8A.

The controller 8A is connected with a request torque input device (not shown) for externally inputting, to the controller 8A, a commanded torque (request torque) for the rotary electric system RS1 by an operator.

The controller 8A includes functional modules 33, Su, Sv, Sw, 34, and 35 illustrated in FIG. 6. The functional modules 33, Su, Sv, Sw, 34, and 35 can be implemented in the controller 8A by software modules or hardware modules.

Figure 7:
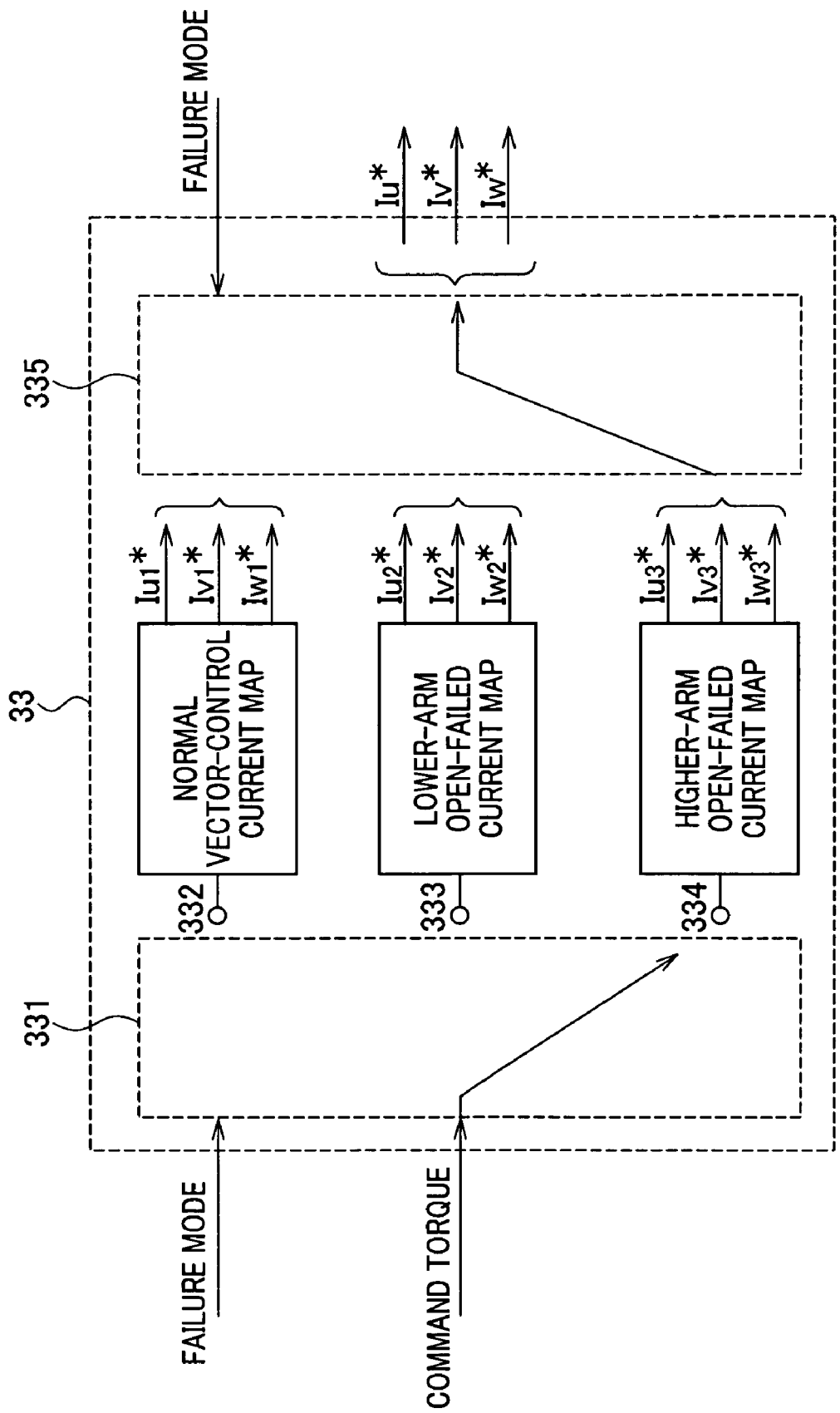
FIG. 7 is a functional block diagram of a three-phase command current value selector illustrated in FIG. 6.

Reference character 33 represents a three-phase command current calculator 33 including current maps 332, 333, and 334 (see FIG. 7). The three-phase command current calculator 33 is operative to calculate, based on the angular pole position θ measured by the pole position sensor 32, a value of the command torque, and the current maps 332, 333, and 334, three-phase command current values Iu*, Iv*, and Iw* to be supplied to the respective three-phase stator windings 11, 12, and 13.

The current map 332 serves as a normal vector-control current map including data indicative of a relationship between a variable of each of three-phase command current values Iu1*, Iv1*, and Iw1* determined to be required in normal state, a variable of the command torque, and a variable of the angular pole position θ.

The current map 333 serves as a lower-arm open-failed vector-control current map including data indicative of a relationship between a variable of each of three-phase command current values Iu2*, Iv2*, and Iw2* determined to be required in lower-arm open-failed state, a variable of the command torque, and a variable of the angular pole position θ.

The current map 334 serves as an upper-arm open-failed vector-control current map including data indicative of a relationship between a variable of each of three-phase command current values Iu3*, Iv3*, and Iw3* determined to be required in upper-arm open-failed state, a variable of the command torque, and a variable of the angular pole position θ.

The three-phase command current calculator 33 also includes a map selector 331 and a command current value selector 335.

When the determination in step S10 is NO, the controller 8A sets a code (flag) "0" representing "normal mode" as a failure mode, and when the determination in step S10 is YES, the controller 8A sets a code "1" representing "low-side open-fault mode" as the failure mode. When the determination in step S8 is YES, the controller 8A sets a code "2" representing "high-side open-fault mode" as the failure mode.

Specifically, in step S12, because the code "0" represents the normal mode as the failure mode, the map selector 331 selects the normal vector-control current map 332. Then, the command current value selector 335 selects, in the map 332, a value of the three-phase command current values Iu1*, Iv1*, and Iw1* corresponding to the angular pole position θ measured by the pole position sensor 32 and the value of the command torque. Thus, the command current value selector 335 outputs the selected value of the three-phase command current values Iu1*, Iv1*, and Iw1* as the three-phase command current values Iu*, Iv*, and Iw*.

In step S24, because the code "1" represents the low-side open-fault mode as the failure mode, the map selector 331 selects the lower-arm open-failed vector-control current map 333. Then, the command current value selector 335 selects, in the map 333, a value of the three-phase command current values Iu2*, Iv2*, and Iw2* corresponding to the angular pole position θ measured by the pole position sensor 32 and the value of the command torque. Thus, the command current value selector 335 outputs the selected value of the three-phase command current values Iu2*, Iv2*, and Iw2* as the three-phase command current values Iu*, Iv*, and Iw*.

In step S20, because the code "2" represents the high-side open-fault mode as the failure mode, the map selector 331 selects the upper-arm open-failed vector-control current map 334. Then, the command current value selector 335 selects, in the map 334, a value of the three-phase command current values Iu3*, Iv3*, and Iw3* corresponding to the angular pole position θ measured by the pole position sensor 32 and the value of the command torque. Thus, the command current value selector 335 outputs the selected value of the three-phase command current values Iu3*, Iv3*, and Iw3* as the three-phase command current values Iu*, Iv*, and Iw*.

Reference characters Su, Sv, Sw represent subtractors. The subtracter Su works to calculate the difference between the U-phase command current value Iu* and a U-phase current value Iu actually measured by the corresponding current sensor 31. Similarly, the subtractor Sv works to calculate the difference between the V-phase command current value Iv* and a V-phase current value Iv actually measured by the corresponding current sensor 31, and the subtractor Sw works to calculate the difference between the W-phase command current value Iw* and a W-phase current value Iw actually measured by the corresponding current sensor 31.

Reference character 34 represents a PI (Proportional Integral) controller. The PI controller 34 works to calculate three-phase voltage command values Vu*, Vv*, and Vw* based on the calculated U-, V-, and W-phase current differences in accordance with a PI feedback control algorithm (PI algorithm).

Specifically, the PI controller 34 works to calculate each of U-, V-, and W-phase voltage command values Vu*, Vv*, and Vw* that allows the calculated U-, V-, and W-phase current differences to become zero.

Reference character 35 represents a converter.

The converter 35 works to convert the calculated three-phase voltage command values Vu*, Vv*, and Vw* into duty cycles for respective three-phase switching elements of the inverter 2. Thereafter, the converter 35 works to generate three-phase pulse signals Gu*, Gv*, and Gw* based on the converted duty cycles for the respective three-phase switching elements of the inverter 2. In other words, the converter 35 works to generate the three-phase pulse signals Gu*, Gv*, and Gw* each with a modulated pulse width with a corresponding one of the converted duty cycles for the respective three-phase switching elements of the inverter 2.

The converter 35 also works to apply the three-phase pulse signals Gu*, Gv*, and Gw* to the respective three-phase switching elements of the inverter 2.

For example, in step S12, the converter 35 applies the U-phase pulse signal Gu* to each of the switching elements SW1 and SW2, the V-phase pulse signal Gv* to each of the switching elements SW3 and SW4, and the W-phase pulse signal Gw* to each of the switching elements SW5 and SW6.

In step S22, the converter 35 applies the U-phase pulse signal Gu* to the switching element SW2, the V-phase pulse signal Gv* to the switching element SW4, and the W-phase pulse signal Gw* to the switching element SW6. In step S26, the converter 35 applies the U-phase pulse signal Gu* to the switching element SW1, the V-phase pulse signal Gv* to the switching element SW3, and the W-phase pulse signal Gw* to the switching element SW5.

Figure 8:
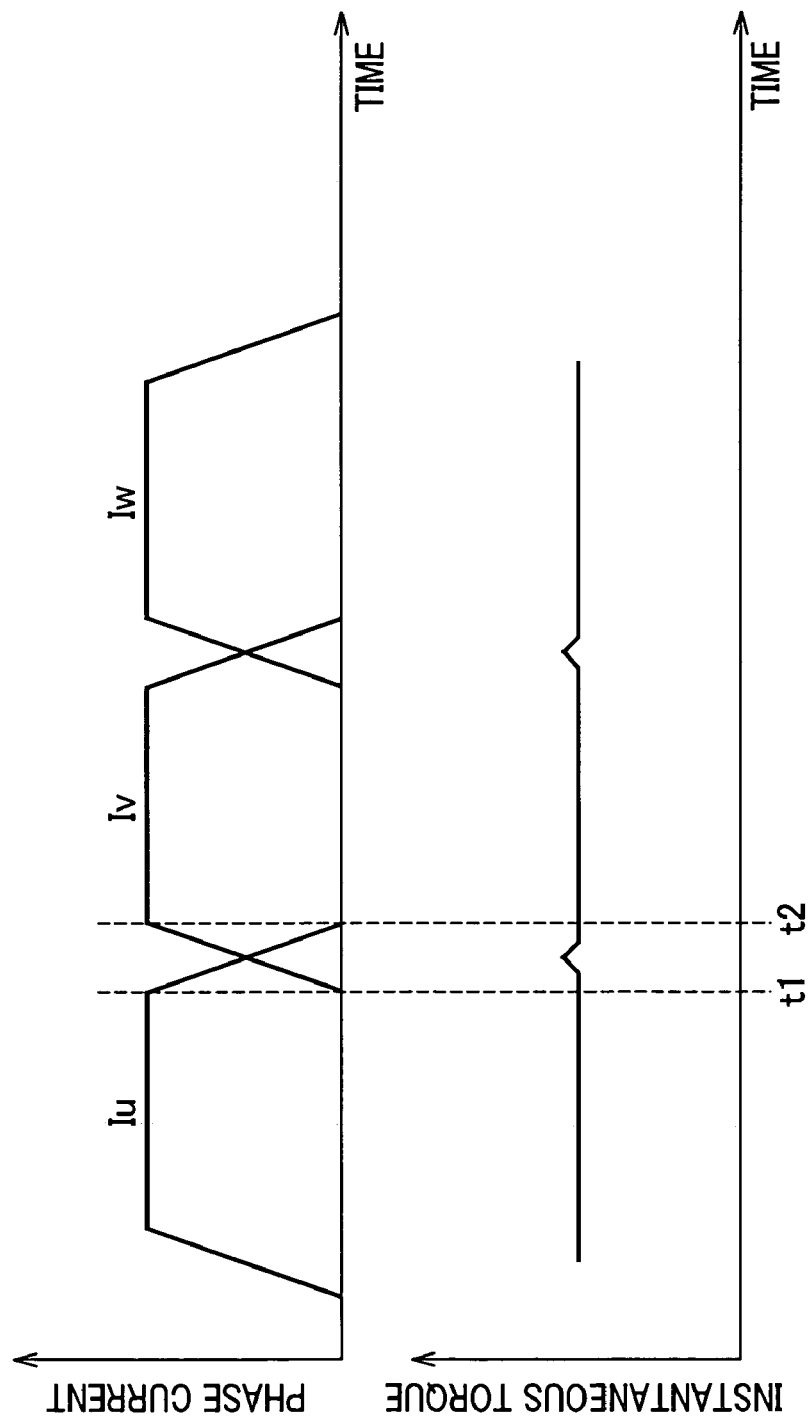
FIG. 8 is graphs, one of which schematically illustrates a waveform of each of three-phase currents to be supplied to respective three-phase stator windings and that of instantaneous torque to be created by a three-phase motor illustrated in FIG. 6 when the inverter is controlled in an upper-arm half-wave driving mode.

FIG. 8 schematically illustrates a waveform of each of the three-phase currents Iu, Iv, and Iw to be supplied to the respective three-phase stator windings 11, 12, and 13 and that of instantaneous torque to be created by the three-phase motor M when the inverter 2 is controlled in the upper-arm half-wave driving mode.

FIG. 8 demonstrates that each of the three-phase currents Iu, Iv, and Iw each with a trapezoidal shape is supplied to a corresponding one of the three-phase stator windings 11, 12, and 13.

When the phase current is commutated from the U-phase current Iu to the V-phase current Iv during a time interval between t2 and t1, the controller 8A works to carry out the constant-current feedback control to thereby set the sum of the U-phase current command value Iu* and the V-phase current command value Iv* to a constant value. This allows the sum of the U-phase current value Iu and the V-phase current value Iv to become the constant value, making it possible to locally minimize torque ripples appearing in the three-phase motor M.

Figure 9:
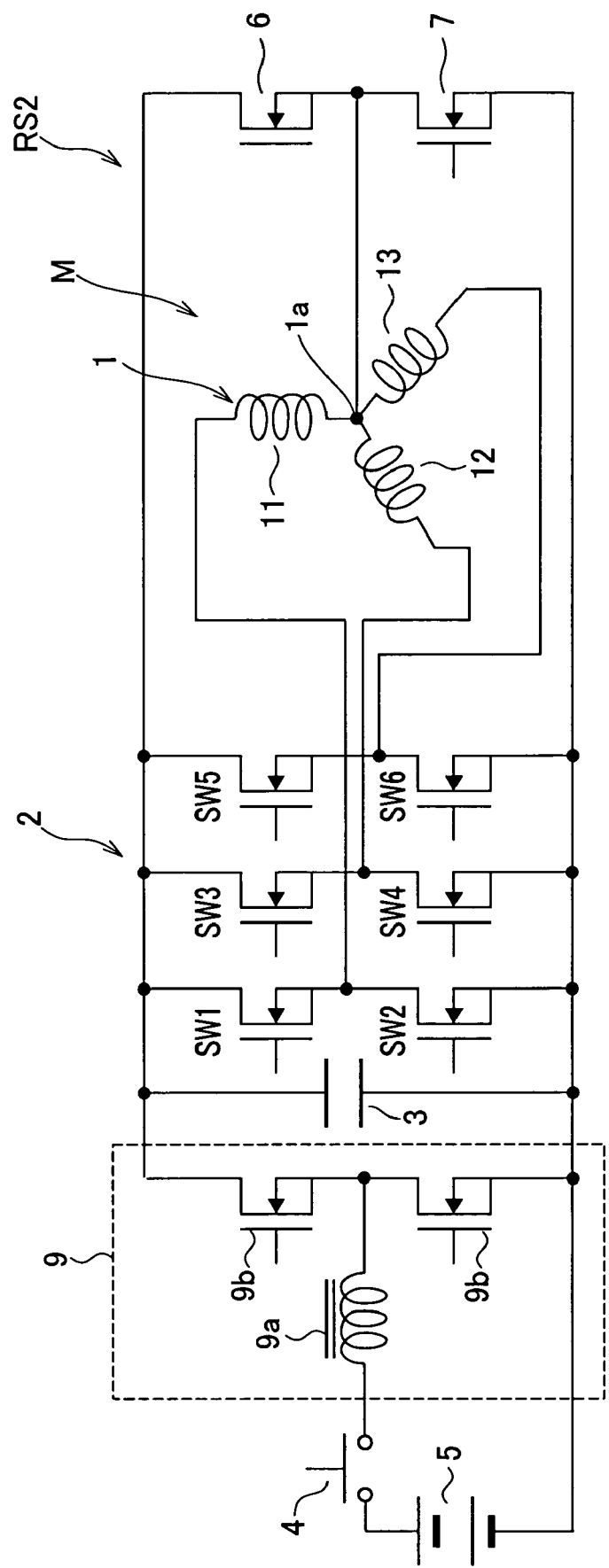
FIG. 9 is a circuit diagram schematically illustrating an example of the structure of a rotary electric system according to a second modification of the embodiment of the present invention.

FIG. 9 schematically illustrates the circuit structure of an example of a rotary electric system RS2 according to a second modification of the embodiment in which the controller 8 and the pole position sensor 32 are omitted in illustration.

In addition to the circuit structure of the rotary electric system RS according to the embodiment, the rotary electric system RS2 includes a DC to DC converter 9, that is, a PAM (Pulse Amplitude Modulation) circuit. The DC to DC converter 9 consists of, for example, a choke coil 9a and a pair of transistors 9b. The DC to DC converter 9 is provided between the relay 4 and the smoothing capacitor 3. The DC to DC converter 9 is designed as a boost chopper. The DC to DC converter 9 works to control its duty ratio to thereby boost the DC voltage of the battery 5 to a required level.

In a third modification of the embodiment, at least one of the first switch 6 and the second switch 7 can be designed as a relay.

The rotary electric systems RS, RS1, and RS2 can be applied to: motor vehicles as their electric power steering systems for increasing steering force to be applied to turning of a steering, hybrid vehicles as their drive systems, electric compressors as their drive systems, radiators as their fan drive systems, and intake and exhaust valve control systems for engines as their drive systems.

As an additional modification, each of the first and second switches 6 and 7 can be made up of a bidirectionally conductive semiconductor device. The semiconductor switch has an operating speed higher than alternative non-semiconductor switches, and therefore, the on and off speed of each of the first and second switches 6 and 7 can be increases as compared with the alternative non-semiconductor switches.

Moreover, it is assumed that one of the rotary electric systems RS, RS1, and RS2 is installed in a drive motor for driving drive wheels of a motor vehicle. In this assumption, when a brake system is activated to decelerate the motor vehicle, energy regenerated by the operations of the brake system is designed to rotate the three-phase motor M. This generates power, and the generated power can be transferred via the bidirectionally conductive semiconductor switch to the battery 5 to be charged therein.

Thus, it is possible to increase the energy efficiency of the one of the rotary electric systems RS, RS1, and RS2.

In the embodiment and its modifications, the present invention is applied to the rotary electric systems each with the star-connected three-phase motor M, but the present invention is not limited to the structures. Specifically, the present invention can be applied to rotary electric machines each with a star-connected multiphase rotary electric machine, such as a star-connected five-phase rotary electric machine.

The rotary electric systems can be designed to control various types of rotary electric machines, such as power generators.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. A rotary electric system comprising:
   a rotary electric machine provided with a rotor and star-connected multiphase stator windings with a neutral point, the rotary electric machine working to rotate the rotor when the multiphase stator windings are energized;
   a direct current power source having a high-side electrode and a low-side electrode;
   a multiphase inverter including a high-side switching element and a low-side switching element per phase of the multiphase stator windings, the high-side and low-side switching elements being connected with each other in series, the multiphase inverter working to energize the multiphase stator windings based on power supplied from the direct current power source when driven;
   a switch member including at least one of a first switch and a second switch, the first switch being connected between the neutral point of the multiphase stator windings and the high-side electrode, the second switch being connected between the neutral point of the multiphase stator windings and the low-side electrode; and
   a contoller connected with the high-side and low-side switching elements per phase of the multiphase stator windings and with the switch member and working to turn the switch member off and on to thereby switch control of the multiphase inverter between full-wave driving mode and half-wave driving mode, the full-wave driving mode allowing the controller to drive all of the high-side and low-side switching elements per phase of the multiphase stator windings, the half-wave driving mode allowing the controller to drive any one of the high-side switching element and the low-side switching element per phase of the multiphase stator windings;
   wherein the switch member includes the first switch connected between the neutral point of the multiphase stator windings and the high-side electrode, and
   the controller is configured to:
   determine whether an open fault occurs in at least one of the high-side switching elements for the respective phases of the multiphase stator windings;
   turn off all of the high-side switching elements for the respective phases of the multiphase stator windings when it is determined that the open fault occurs in at least one of the high-side switching elements for the respective phases of the multiphase stator windings;
   turn the first switch on; and
   sequentially turn on and off the low-side switching elements for the respective phases of the multiphase stator windings to thereby drive the multiphase inverter in the half-wave driving mode.

2. A rotary electric system according to claim 1, wherein, in the half-wave driving mode, the controller is configured to turn on any one of the high-side switching element and the low-side switching element per phase of the multiphase stator windings by applying a substantially square-wave voltage thereto, and the controller is configured to adjust an on duration of any one of the high-side switching element and the low-side switching element per phase of the multiphase stator windings to be within a range between 120 electric degrees and 180 electric degrees of rotation of the rotor.

3. A rotary electric system according to claim 2, wherein, in the half-wave driving mode, the controller is configured to adjust a command current per phase of the multiphase stator windings to be supplied from the multiphase inverter such that the adjusted command current is matched with an actual current flowing through a corresponding phase stator winding of the multiphase stator windings and fed back therefrom.

4. A rotary electric system according to claim 3, wherein the controller is configured to adjust a command current for one phase stator winding of the multiphase stator windings and that for an alternative phase stator winding of the multiphase stator windings such that the sum of the adjusted command currents for the one and alternative phase stator windings of the multiphase stator windings becomes a constant value.

5. A rotary electric system according to claim 1, wherein the switch member includes the first switch and the second switch, and each of the first and second switches is made up of a bidirectionally conductive semiconductor device.

6. A rotary electric system according to claim 1, wherein each of the high-side switching element and low-side switching element per phase of the multiphase stator windings is made up of a semiconductor device with a current sense terminal.

7. A rotary electric system according to claim 1, wherein the rotary electric machine is installed in a power steering system as a drive motor for increasing steering force to be applied to a steering.

8. A rotary electric system according to claim 1, wherein the rotary electric machine is installed in a motor vehicle as a drive motor for driving drive wheels of the motor vehicle.

9. A rotary electric system according to claim 1, wherein the rotary electric machine is installed in an air-conditioner for a motor vehicle as a drive motor for driving a compressor of the air-conditioner.

10. A rotary electric system according to claim 1, wherein the rotary electric machine is installed in a radiator for a motor vehicle as a drive motor for driving a cooling fan of the radiator.

11. A rotary electric system according to claim 1, wherein the rotary electric machine is installed in an internal combustion engine for a motor vehicle as a drive motor for driving at least one of intake and exhaust valves of the internal combustion engine.

12. A rotary electric system comprising:
a rotary electric machine provided with a rotor and star-connected multiphase stator windings with a neutral point, the rotary electric machine working to rotate the rotor when the multiphase stator windings are energized;
a direct current power source having a high-side electrode and a low-side electrode;
a multiphase inverter including a high-side switching element and a low-side switching element per phase of the multiphase stator windings, the high-side and low-side switching elements being connected with each other in series, the multiphase inverter working to energize the multiphase stator windings based on power supplied from the direct current power source when driven;
a switch member including at least one of a first switch and a second switch, the first switch being connected between the neutral point of the multiphase stator windings and the high-side electrode, the second switch being connected between the neutral point of the multiphase stator windings and the low-side electrode; and
a controller connected with the high-side and low-side switching elements per phase of the multiphase stator windings and with the switch member and working to turn the switch member off and on to thereby switch control of the multiphase inverter between full-wave driving mode and half-wave driving mode, the full-wave driving mode allowing the controller to drive all of the high-side and low-side switching elements per phase of the multiphase stator windings, the half-wave driving mode allowing the controller to drive any one of the high-side switching element and the low-side switching element per phase of the multiphase stator windings;
wherein the switch member includes the second switch connected between the neutral point of the multiphase stator windings and the low-side electrode, and
the controller is configured to:
determine whether an open fault occurs in at least one of the low-side switching elements for the respective phases of the multiphase stator windings;
turn off all of the low-side switching elements for the respective phases of the multiphase stator windings when it is determined that the open fault occurs in at least one of the low-side switching elements for the respective phases of the multiphase stator windings;
turn the second switch on; and
sequentially turn on and off the high-side switching elements for the respective phases of the multiphase stator windings to thereby drive the multiphase inverter in the half-wave driving mode.

13. A rotary electric system according to claim 12, wherein, in the half-wave driving mode, the controller is configured to turn on any one of the high-side switching element and the low-side switching element per phase of the multiphase stator windings by applying a substantially square-wave voltage thereto, and the controller is configured to adjust an on duration of any one of the high-side switching element and the low-side switching element per phase of the multiphase stator windings to be within a range between 120 electric degrees and 180 electric degrees of rotation of the rotor.

14. A rotary electric system according to claim 12, wherein the switch member includes the first switch and the second switch, and each of the first and second switches is made up of a bidirectionally conductive semiconductor device.

15. A rotary electric system according to claim 12, wherein each of the high-side switching element and low-side switching element per phase of the multiphase stator windings is made up of a semiconductor device with a current sense terminal.

16. A rotary electric system according to claim 12, wherein the rotary electric machine is installed in a power steering system as a drive motor for increasing steering force to be applied to a steering.

17. A rotary electric system according to claim 12, wherein the rotary electric machine is installed in a motor vehicle as a drive motor for driving drive wheels of the motor vehicle.

18. A rotary electric system according to claim 12, wherein the rotary electric machine is installed in an air-conditioner for a motor vehicle as a drive motor for driving a compressor of the air-conditioner.

19. A rotary electric system according to claim 12, wherein the rotary electric machine is installed in a radiator for a motor vehicle as a drive motor for driving a cooling fan of the radiator.

20. A rotary electric system according to claim 12, wherein the rotary electric machine is installed in an internal combustion engine for a motor vehicle as a drive motor for driving at least one of intake and exhaust valves of the internal combustion engine.

21. A rotary electric system comprising:
a rotary electric machine provided with a rotor and star-connected multiphase stator windings with a neutral point, the rotary electric machine working to rotate the rotor when the multiphase stator windings are energized;
a direct current power source having a high-side electrode and a low-side electrode;
a multiphase inverter including a high-side switching element and a low-side switching element per phase of the multiphase stator windings, the high-side and low-side switching elements being connected with each other in series, the multiphase inverter working to energize the multiphase stator windings based on power supplied from the direct current power source when driven;
a switch member including at least one of a first switch and a second switch, the first switch being connected between the neutral point of the multiphase stator windings and the high-side electrode, the second switch being connected between the neutral point of the multiphase stator windings and the low-side electrode; and
a controller connected with the high-side and low-side switching elements per phase of the multiphase stator windings and with the switch member and working to turn the switch member off and on to thereby switch control of the multiphase inverter between full-wave driving mode and half-wave driving mode, the full-wave driving mode allowing the controller to drive all of the high-side and low-side switching elements per phase of the multiphase stator windings, the half-wave driving mode allowing the controller to drive any one of the high-side switching element and the low-side switching element per phase of the multiphase stator windings;
wherein the switch member includes the first switch and the second switch connected between the neutral point of the multiphase stator windings and the high-side electrode and between the neutral point of the multiphase stator windings and the low-side electrode, respectively, and
the controller is configured to:
operate in a low-side switching-element driving mode when it is determined that an open fault occurs in at least one of the high-side switching elements for the respective phases of the multiphase stator windings thereby:
turning all of the high-side switching elements off;
turning the first switch on; and
sequentially turning on and off the low-side switching elements for the respective phases of the multiphase stator windings so as to drive the multiphase inverter in the half-wave driving mode; and
operate in a high-side switching-element driving mode when it is determined that an open fault occurs in at least one of the low-side switching elements for the respective phases of the multiphase stator windings thereby:
turning all of the low-side switching elements off;
turning the second switch on; and
sequentially turning on and off the high-side switching elements for the respective phases of the multiphase stator windings so as to drive the multiphase inverter in the half-wave driving mode.

22. A rotary electric system according to claim 21, wherein, in the half-wave driving mode, the controller is configured to turn on any one of the high-side switching element and the low-side switching element per phase of the multiphase stator windings by applying a substantially square-wave voltage thereto, and the controller is configured to adjust an on duration of any one of the high-side switching element and the low-side switching element per phase of the multiphase stator windings to be within a range between 120 electric degrees and 180 electric degrees of rotation of the rotor.

23. A rotary electric system according to claim 21, wherein the switch member includes the first switch and the second switch, and each of the first and second switches is made up of a bidirectionally conductive semiconductor device.

24. A rotary electric system according to claim 21, wherein each of the high-side switching element and low-side switching element per phase of the multiphase stator windings is made up of a semiconductor device with a current sense terminal.

25. A rotary electric system according to claim 21, wherein the rotary electric machine is installed in a power steering system as a drive motor for increasing steering force to be applied to a steering.

26. A rotary electric system according to claim 21, wherein the rotary electric machine is installed in a motor vehicle as a drive motor for driving drive wheels of the motor vehicle.

27. A rotary electric system according to claim 21, wherein the rotary electric machine is installed in an air-conditioner for a motor vehicle as a drive motor for driving a compressor of the air-conditioner.

28. A rotary electric system according to claim 21, wherein the rotary electric machine is installed in a radiator for a motor vehicle as a drive motor for driving a cooling fan of the radiator.

29. A rotary electric system according to claim 21, wherein the rotary electric machine is installed in an internal combustion engine for a motor vehicle as a drive motor for driving at least one of intake and exhaust valves of the internal combustion engine.

30. A rotary electric system comprising:
a rotor electric machine provided with a rotor and star-connected multiphase stator windings with a neutral point, the rotary electric machine working to rotate the rotor when the multiphase stator windings are energized;
a direct current power source having a high-side electrode and a low-side electrode;
a multiphase inverter including a high-side switching element and a low-side switching element per phase of the multiphase stator windings, the high-side and low-side switching elements being connected with each other in series, the multiphase inverter working to energize the multiphase stator windings based on power supplied from the direct current power source when driven;
a switch member including at least one of a first switch and a second switch, the first switch being connected between the neutral point of the multiphase stator windings and the high-side electrode, the second switch being connected between the neutral point of the multiphase stator windings and the low-side electrode; and
a controller connected with the high-side and low-side switching elements per phase of the multiphase stator windings and with the switch member and working to turn the switch member off and on to thereby switch control of the multiphase inverter between full-wave driving mode and half-wave driving mode, the full-wave driving mode allowing the controller to drive all of the high-side and low-side switching elements per phase of the multiphase stator windings, the half-wave driving mode allowing the controller to drive any one of the high-side switching element and the low-side switching element per phase of the multiphase stator windings;

wherein the switch member includes the first switch and the second switch connected between the neutral point of the multiphase stator windings and the high-side electrode and between the neutral point of the multiphase stator windings and the low-side electrode, respectively, and in the full-wave driving mode, the controller is configured to turn each of the first and second switches off to thereby carry out vector control of the multiphase inverters, the vector control being designed to:

resolve a current to be supplied to each of the multiphase stator windings from the multiphase inverter into separately controllable flux producing current component and torque producing component, the flux producing current component and the torque producing current component defining a current vector; and control the current vector to thereby control the rotary electric machine.

31. A rotary electric system according to claim 30, wherein, in the half-wave driving mode, the controller is configured to turn on any one of the high-side switching element and the low-side switching element per phase of the multiphase stator windings by applying a substantially square-wave voltage thereto, and the controller is configured to adjust an on duration of any one of the high-side switching element and the low-side switching element per phase of the multiphase stator windings to be within a range between 120 electric degrees and 180 electric degrees of rotation of the rotor.

32. A rotary electric system according to claim 30, wherein the switch member includes the first switch and the second switch, and each of the first and second switches is made up of a bidirectionally conductive semiconductor device.

33. A rotary electric system according to claim 30, wherein each of the high-side switching element and low-side switching element per phase of the multiphase stator windings is made up of a semiconductor device with a current sense terminal.

34. A rotary electric system according to claim 30, wherein the rotary electric machine is installed in a power steering system as a drive motor for increasing steering force to be applied to a steering.

35. A rotary electric system according to claim 30, wherein the rotary electric machine is installed in a motor vehicle as a drive motor for driving drive wheels of the motor vehicle.

36. A rotary electric system according to claim 30, wherein the rotary electric machine is installed in an air-conditioner for a motor vehicle as a drive motor for driving a compressor of the air-conditioner.

37. A rotary electric system according to claim 30, wherein the rotary electric machine is installed in a radiator for a motor vehicle as a drive motor for driving a cooling fan of the radiator.

38. A rotary electric system according to claim 30, wherein the rotary electric machine is installed in an internal combustion engine for a motor vehicle as a drive motor for driving at least one of intake and exhaust valves of the internal combustion engine.

* * * * *